United States Patent [19]
Linhardt

[11] 3,799,249
[45] Mar. 26, 1974

[54] HOT GAS HEAT EXCHANGER

[75] Inventor: Hans D. Linhardt, Costa Mesa, Calif.

[73] Assignee: Air Reduction, Incorporated, New York, N.Y.

[22] Filed: Nov. 26, 1969

[21] Appl. No.: 880,041

[52] U.S. Cl............... 165/60, 165/100, 62/310, 261/153
[51] Int. Cl.................................. F24f 3/14
[58] Field of Search ............... 165/1, 111, 51, 60; 62/310, 314; 60/39.5; 261/113

[56] References Cited
UNITED STATES PATENTS

| | | |
|---|---|---|
| 3,274,752 | 9/1966 | Huyghe et al.............. 165/1 |
| 3,369,361 | 2/1968 | Craig....................... 60/39.5 |
| 2,951,687 | 9/1960 | Schulenberg et al......... 165/1 |

Primary Examiner—Charles Sukalo
Attorney, Agent, or Firm—H. Hume Mathews, Edmund W. Bopp, Roger M. Rathburn

[57] ABSTRACT

A heat exchanger comprising a jet engine with exhaust conduit, heat transfer coils containing a cryogenic liquid to be vaporized within the conduit and in the path of the engine exhaust gases, a manifold in the conduit located upstream of the heat transfer coils and toward the engine exhaust for injection of water spray into the hot exhaust gases, and circulation pumps for the cryogenic liquid, spray water, and spray water condensate respectively, operated by power-takeoff from the engine.

11 Claims, 2 Drawing Figures

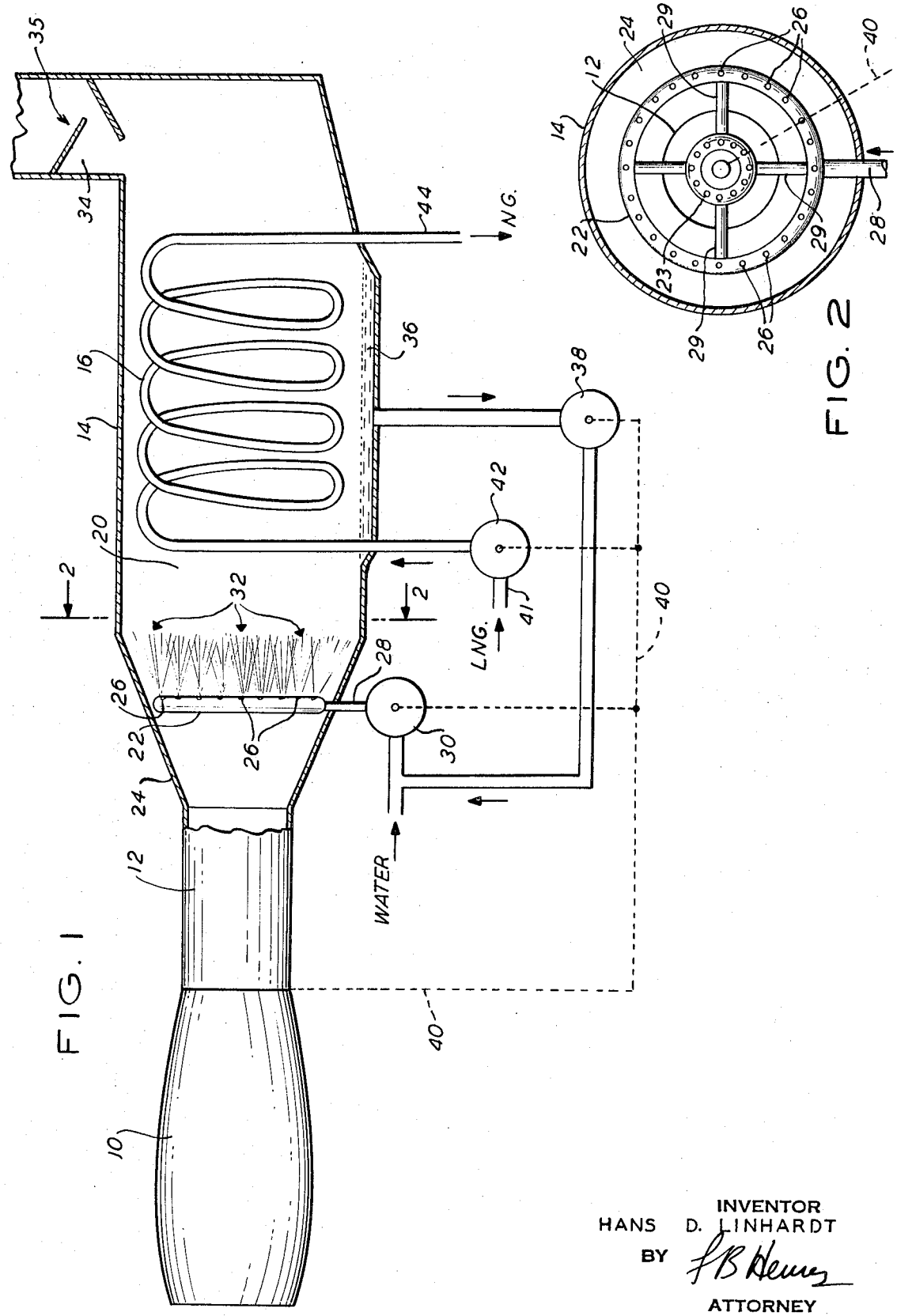

HOT GAS HEAT EXCHANGER

BACKGROUND OF THE INVENTION

The invention relates generally to heat transfer systems wherein a high-heat generating source, such as a jet-type engine, provides a continuous flow of hot gases for supplying heat to a medium that is circulated through coils or the like, disposed in the path of the hot gases. Heat transfer systems of this type have been used in aircraft, for example, wherein the hot exhaust gases from a jet engine are used for heating air that is circulated through a heat exchanger connected to the engine exhaust. The heated air in turn, is used for space heating, air-foil de-icing, and the like. It has also been proposed to vaporize cryogenic liquids such as liquid nitrogen, in a submersion-type heat exchanger wherein one or more fuel burners direct hot exhaust gases at superatmospheric pressure through ducts into a body of water surrounding heat transfer passages for the circulating nitrogen. In this two-stage arrangement, the water is heated by direct bubbling-contact with the hot exhaust gases, and the water in turn heats and vaporizes the liquid nitrogen within the heat transfer passages. Although this system provides for moderating the temperature gradient between the hot gases and the cold liquid nitrogen, the two-stage heat transfer equipment required is space-consuming, expensive and complicated in structural assembly.

The temperature moderating effect referred to above, is not only desirable but is especially important where hydrocarbon cryogenic liquids, such as liquid methane (natural gas) are to be vaporized for piping into commercial storage or distribution lines. For such liquids, application of excessive heat to the heat transfer surfaces can be hazardous and result in explosions, fires, etc.

Insofar as known, an efficient, simple and inexpensive single-stage heat transfer system utilizing the heat of engine (or fuel burner) exhaust gases for safely and efficiently vaporizing cryogenic liquids and the like, have not been developed prior to the present invention.

As used herein, the term "cryogenic liquid" is intended to mean a liquid, ordinarily a gas at ambient temperature, that requires a temperature materially below the freezing point of water for keeping it in a state of liquefaction.

SUMMARY OF THE INVENTION

In accordance with the invention, a convenient source of heat, such as the exhaust of a jet-type engine or burner, is connected with a conduit of suitable cross-sectional area for continuous flow therethrough of the exhaust gases. Heat transfer coils, or the like, containing circulating cryogenic liquid to be vaporized, are disposed within the conduit directly in the flow of the exhaust gases. For moderating the heat transfer effect of the hot exhaust gases, a manifold or the like is located adjacent the engine exhaust and upstream from the heat transfer coils for injecting or spraying cooling water directly into the exhaust gases throughout the cross-sectional area of the flow path. The resulting vaporization of most, or all, of the injected water into steam not only materially reduces the temperature of the exhaust gases, but also provides a more dense and efficient medium for uniform transfer of heat to the liquid-containing coils.

Where conservation of water is a factor, condensate from the coils and water separated from the exhaust gases venting thereof can be collected in the conduit and pumped for recirculation to the spray source.

In a preferred form of the invention, a conventional turbo-jet engine can be conveniently used for providing the hot vaporizing gases as well as power for driving the respective supply and circulation pumps for the spray water, cryogenic liquid, and condensate return.

A principal object of the invention, therefore, is an improved hot gas heat exchanger for vaporizing cryogenic liquids, wherein the temperature of the hot gas is materially reduced and its mass increased by an inert heat transfer medium for reducing overheating hazards during heat transfer while increasing heat transfer efficiency.

A further object is an improved heat exchanger of the character described above, that utilizes jet engine exhaust gases mixed with water vapor for efficient hazard-free vaporization of cryogenic liquid, and that is simple and inexpensive in arrangement and construction.

BRIEF DESCRIPTION OF DRAWING

FIG. 1 is a schematic illustration, partly in section, of a hot gas heat exchanger embodying the invention, and FIG. 2 is a view taken along the line 2—2 of FIG. 1.

DESCRIPTION OF PREFERRED EMBODIMENT

The heat exchanger of the invention illustrated by way of example in FIG. 1, comprises a convenient source of heat, such as a conventional jet engine 10 having an exhaust or tail pipe 12. A conduit 14 is connected to the tail pipe for receiving the engine exhaust gases that flow across the heat exchange surfaces of coils 16 located within the conduit and defining loops in the path of the hot exhaust gases. The coils 16 contain a circulating cryogenic liquid, such as liquefied natural gas to be vaporized for commercial use.

The conduit 14 is of increased diameter or cross-sectional area, as compared with the tail pipe, thereby forming a chamber 20 within which the velocity of the exhaust gases is reduced for increasing the contact time between the moving mass of gas and the heat transfer surfaces of the coils 16.

In the single-stage heat exchange apparatus so far described, the highly heated exhaust gases flowing past the coils in direct heat transfer contact therewith tend to overheat and weaken the coil structure, as well as overheat the coil contents. A serious explosion and/or fire hazard can therefore be created with this arrangement per se where highly combustible hydrocarbons and the like are involved.

In accordance with the invention, these hazards are greatly reduced or eliminated for practical purposes by effectively reducing the temperature of the exhaust gases by water spray prior to contact with the coils 16. At the same time, the mass of the gas stream is increased by the flashed water vapor or steam for producing a gas-steam mixture that functions as an efficient heat transfer medium throughout the coil surface area.

To this end, a multiple-spray manifold or header arrangement is located upstream of the coils 16 for cooling the hot gases by water spray. The header arrangement may conveniently comprise a pair of concentrically positioned annular spray tubes 22 and 23 mounted in the expander-section 24 between the tail pipe and chamber 20 so that the gas flow is transversely of the plane of the manifold as indicated in FIGS. 1 and 2. For injecting the water spray into the exhaust gases, the header tubes are provided with peripherally spaced spray apertures 26 (or jet nozzles as preferred) that face the chamber 20 and coils 16. The manifold is connected by pipes 28 and 29 to a source of pressurized water such as a pump 30, for supplying a continuous supply of spray water to the manifold.

In operation, the water from the manifold 22,23 is injected under sufficient pressure into the exhaust gases so that the diverging sprays indicated at 32 enter and dilute the hot gas stream throughout the entire cross-sectional area thereof. The spray, preferably in the form of a heavy mist, quickly absorbs heat from the hot gas stream and immediately vaporizes into steam, thereby reducing the temperature of the stream according to the incoming water temperature, and the heat absorbed during vaporization, as represented by $$M(\Delta t) + (H_v \times M),$$

wherein $M$ is the mass of the spray water, $\Delta t$ is the difference in temperature between the incoming water and the vaporizing temperature, and $H_v$ is the heat of vaporization per unit mass of water.

In so reducing the temperature gradient of the exhaust gases at the heat transfer surfaces of the coils 16, the resulting added mass of water vapor provides more effective heat transfer along the coil surfaces. That is, as the water vapor contacts the comparatively cold surfaces of the cryogenic coils, the resulting condensing process provides more efficient and uniform heat transfer at the coils than by contact solely with heated gas molecules. Furthermore, the inert characteristics of the gas-water vapor stream minimize danger of explosion within the heat exchanger in case of methane leakage for example, from a defective coil. Accordingly, the prior disadvantages of hot gas heat exchangers using a source of highly heated gas, are overcome while retaining the obvious advantages of single-stage heat transfer.

In practice, the upstream position of the water spray manifold 22,23 in relation to the heat transfer passages is determined empirically according to the amount of water cooling spray needed as steam to reduce the temperature of the exhaust gases to a proper working level. Preferably, the upstream distance is such that the spray is vaporized into steam prior to flow past the heat transfer surfaces of the liquid passages in order to obtain the improved heat transfer properties of the mixed gas-water medium.

The waste exhaust gases, together with water vapor are suitably vented from the chamber 20 by way of a flue or stack 34. That part of the water vapor which is condensed by contact with the initially cold cryogenic liquid passages, collects at 36 in a sump at the bottom of the chamber 20, from which it is recovered by a pump 38 and recirculated if so desired, to the inlet of the water spray pump 30. For returning moisture remaining in the waste gases to the sump, a conventional water trap or separator can be mounted in the flue 24 as generally indicated at 35.

The cryogenic liquid in the heat transfer coils 16, presently liquefied natural gas LNG, is drawn from a suitable storage source indicated at 41, by a pump 42 mounted in the expander-section 24 and directed through the coils for vaporization, the vaporized product natural gas NG being piped at 44 for storage or distribution. The pumps 30, 38 and 42 referred to above are conveniently operated by a power take-off connection generally indicated at 40, from the jet engine 10.

Having set forth the invention in what is considered to be the best embodiment thereof, it will be understood that changes may be made in the system and apparatus as above set forth without departing from the spirit of the invention or exceeding the scope thereof as defined in the following claims.

I claim:

1. A hot gas heat exchanger for vaporizing cryogenic liquids comprising a burner for producing a continuous stream of highly heated gas, a chamber for receiving the gas stream having fluid passages adapted to contain combustible cryogenic fluid in liquid and vapor phases in heat transfer relation to the gas stream, and means located upstream from the heat transfer passages for injecting water directly into the main hot gas stream for rapidly generating steam and producing a gas-steam heat transfer mixture that materially increases the heat transfer mass of the stream for efficiently vaporizing the cryogenic liquid at reduced stream temperature, and that is sufficiently inert for maintaining a substantially non-combustible atmosphere in the heat exchanger.

2. A hot gas heat exchanger as specified in claim 1 wherein the cryogenic liquid passages define multiple loops disposed in the path of the gas stream, and the water injecting means is spaced a sufficient distance upstream for substantial vaporization of the water into steam prior to initial heat transfer contact of the gas-steam mixture with the liquid passage loops.

3. A hot gas heat exchanger for vaporizing cryogenic liquids comprising a jet engine providing at its exhaust a stream of hot gas, a chamber for receiving the gas stream having passages adapted to contain a cryogenic liquid in heat transfer relation to the gas stream, and means located upstream from the heat transfer passages for injecting water into the hot gas stream for reducing the temperature thereof and producing a gas-steam heat transfer mixture, thereby increasing the heat transfer mass of the stream for efficiently vaporizing the cryogenic liquid within the passages, and a plurality of pumps that operate respectively by power takeoff from the engine and produce respectively flow of injection water, flow of cryogenic liquid through the heat transfer passages, and return of cold-surface condensate from the chamber to the injection water supply.

4. A hot gas heat exchanger as specified in claim 1 wherein the injecting means injects water into the hot gas stream so as to generate sufficient steam for maintaining a substantially inert heat transfer mixture at the heat transfer passages and for maintaining the inert atmosphere at reduced temperature for preventing overheating in the passages.

5. A hot gas heat exchanger as specified in claim 2 wherein burner means produce highly heated combustion gases, and the injection water generates quantities of steam for materially increasing the heat transfer mass of the resulting reduced temperature gas-steam mixture, the cooled gas-steam mixture is guided into heat transfer relation with the multiple loops for vaporizing the cryogenic liquid to a product gas, and recycling means collect the resulting steam condensate from the loops for injection water.

6. A heat exchanger for vaporizing cryogenic liquid comprising burner means adapted to generate hot gases, conduit means to direct the hot gases from the burner means to a point of exhaust to the atmosphere, means to spray water into the hot gases passing through the conduit means whereby the water is vaporized and the temperature of the hot gases is lowered, passage means in said conduit means downstream of said spray means, means to introduce cryogenic liquid into said passage means and means to collect the water condensed on said passage means and return it to the water spray means.

7. A heat exchanger as defined in claim 6 wherein the water spray means comprises a plurality of nozzles directing the spray in a downstream direction.

8. A heat exchanger as defined in claim 6 wherein the means to introduce cryogenic liquid includes a pump connected to a storage source.

9. A heat exchanger as defined in claim 6 wherein the passage means includes a tube coil.

10. A heat exchanger as defined in claim 8 wherein the cryogenic liquid is liquefied natural gas.

11. A heat exchanger as defined in claim 6 wherein the conduit means at the point of gas exhaust to atmosphere, constitutes a flue having a water separator for recovering part of the uncondensed spray water.

* * * * *

UNITED STATES PATENT OFFICE
CERTIFICATE OF CORRECTION

Patent No. 3,799,249     Dated March 26, 1974

Inventor(s)  Hans D. Linhardt

It is certified that error appears in the above-identified patent and that said Letters Patent are hereby corrected as shown below:

On the cover sheet [73] "Air Reduction, Incorporated" should read -- Airco, Inc. --.

Signed and sealed this 4th day of February 1975.

(SEAL)
Attest:

McCOY M. GIBSON JR.
Attesting Officer

C. MARSHALL DANN
Commissioner of Patents

Disclaimer 3,799,249.—*Hans D. Linhardt*, Costa Mesa, Calif. HOT GAS HEAT EX-
CHANGER. Patent dated Mar. 26, 1974. Disclaimer filed Apr. 29,
1975, by the assignee, *Airco, Inc.*
Hereby enters this disclaimer to the entire term of said patent.
[*Official Gazette September 2, 1975.*]